Sept. 2, 1969  B. L. SIEGAL  3,465,139
INTERNALLY ILLUMINATED ARTIFICIAL TREE
Filed March 1, 1967  3 Sheets-Sheet 1
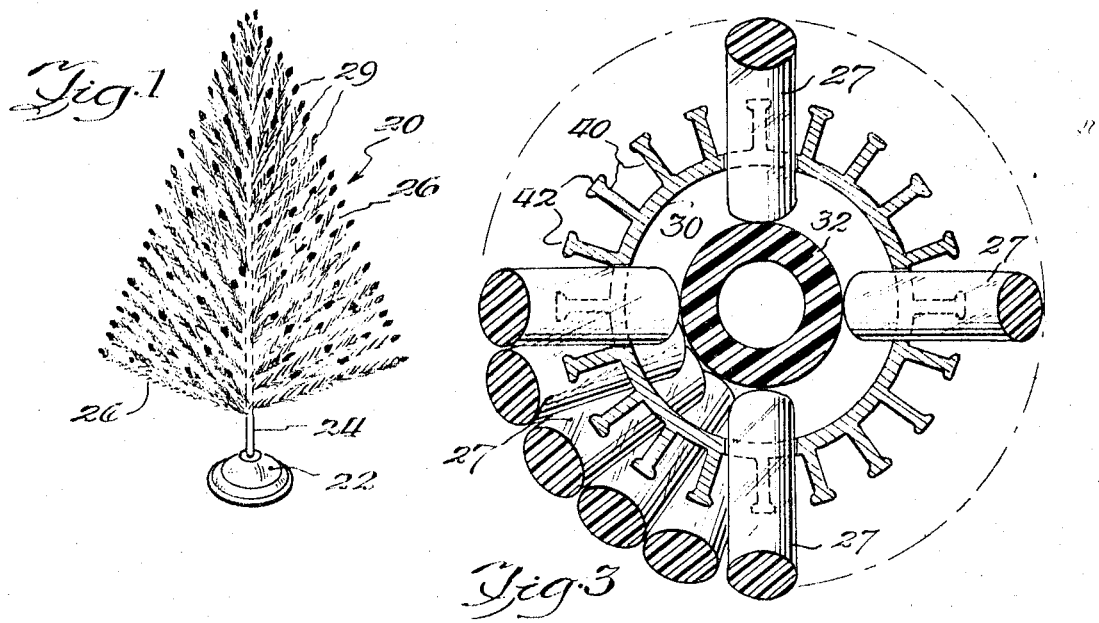
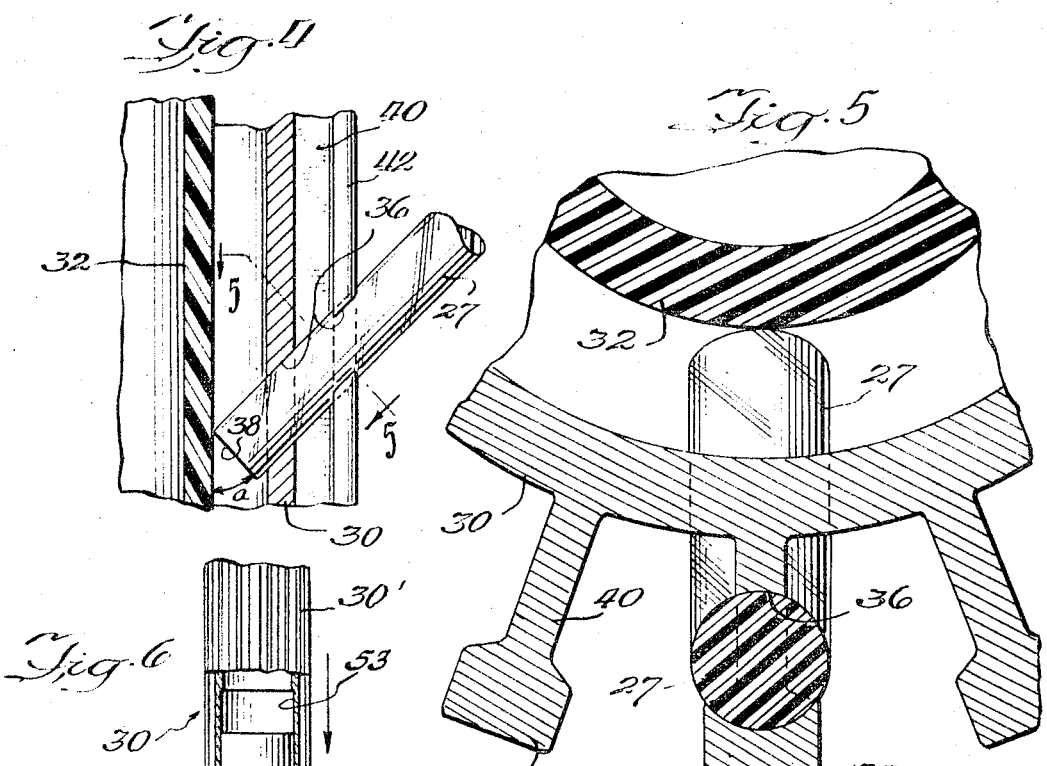
INVENTOR
Burton L. Siegal
BY Silverman & Cass
ATTORNEYS

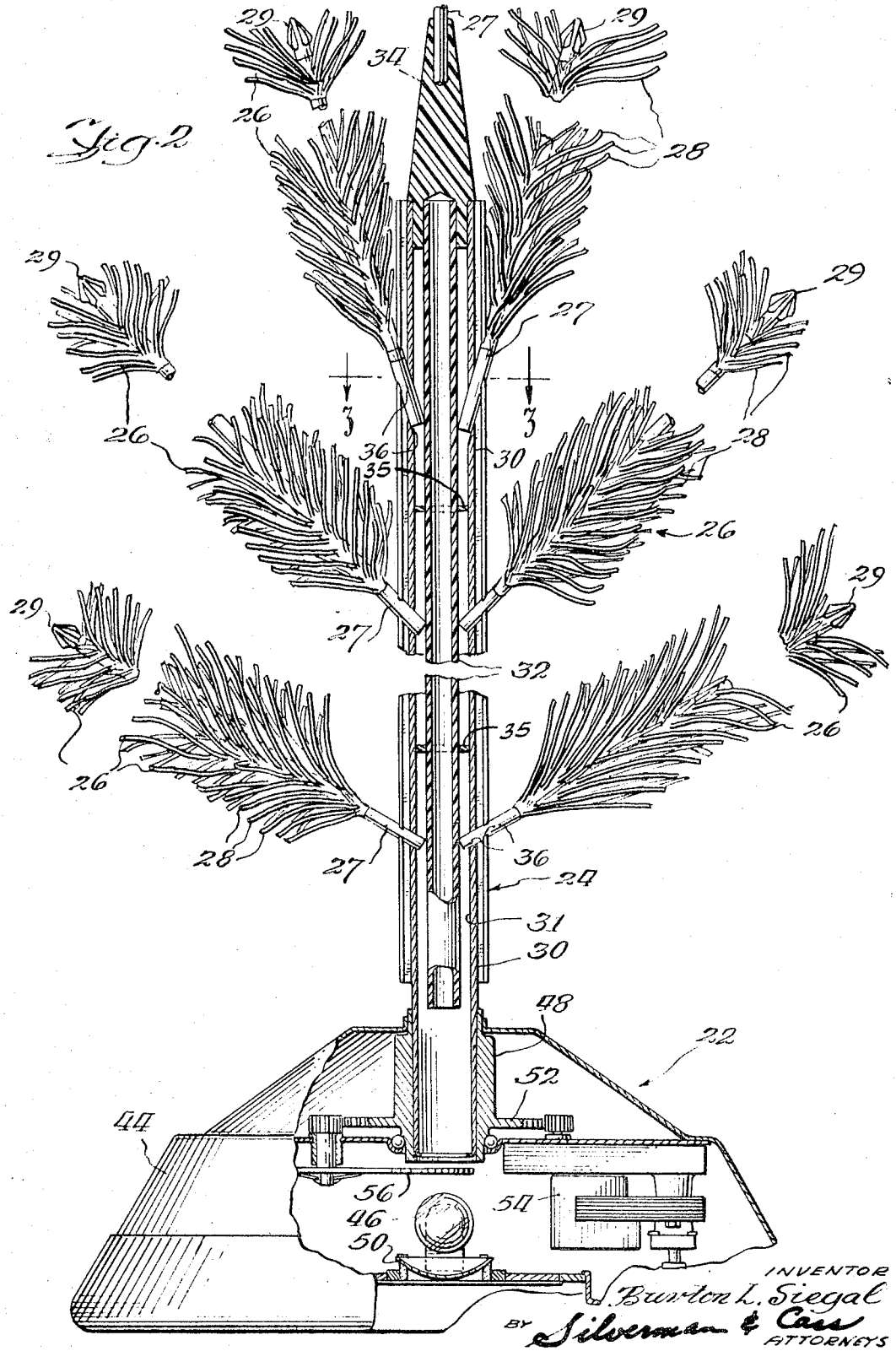

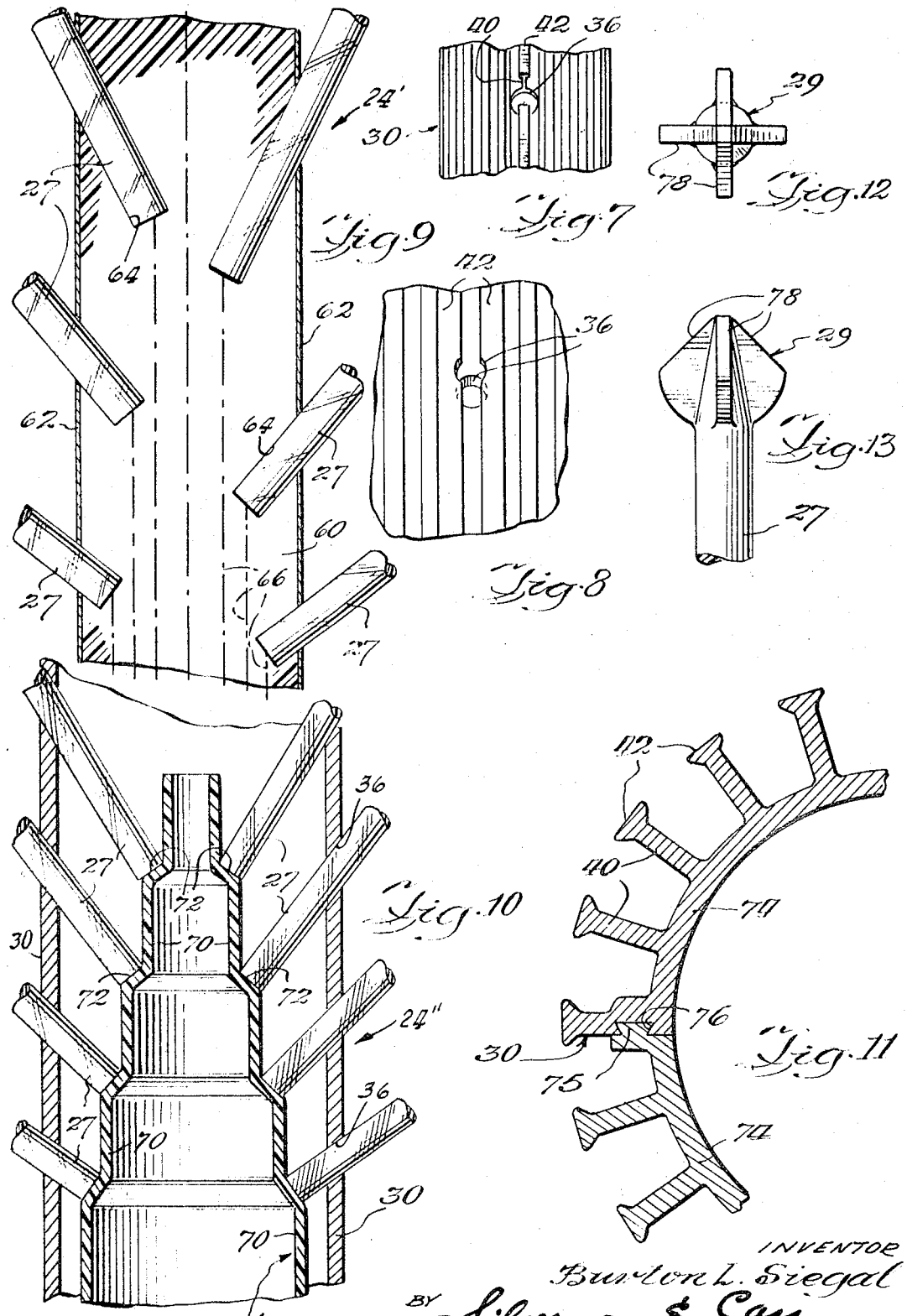

United States Patent Office 3,465,139
Patented Sept. 2, 1969

3,465,139
INTERNALLY ILLUMINATED ARTIFICIAL TREE
Burton L. Siegal, Skokie, Ill., assignor to Mard Continental, Inc., Chicago, Ill., a corporation of Illinois
Filed Mar. 1, 1967, Ser. No. 619,771
Int. Cl. F21p 1/02
U.S. Cl. 240—10        4 Claims

ABSTRACT OF THE DISCLOSURE

An internally illuminated artificial tree has a trunk section capable of receiving and transmitting light rays emitted from an illumination source associated with the supporting base for the tree, and a plurality of branch elements removably secured to the trunk of the tree each including a stem member constructed of a transparent light transmitting material. The inner end of each stem member is optically associated with said light transmitting trunk such that the inner end surface thereof can receive a portion of the light rays being transmitted internally along said trunk for transmission to and diffusion at the outer end of said stem member so as to cause said outer end to glow.

BACKGROUND OF INVENTION

One area wherein artificial plants have enjoyed a successful rise in popularity is that of knock-down or collapsible Christmas trees. These artificial trees are generally constructed of a trunk which is provided with a plurality of sockets or other means for receiving and supporting the artificial branches. The branches may be of varied construction, a very popular form utilizing an elongated stem about which foliage in the form of highly reflective metal foil or plastic film is wrapped. The artificial foliage can be left as is, or it may be flocked to enhance the aesthetic effect.

Additional decorative means have been used, such as strings of individual lights and indirect lighting by separate spotlights and rotating color wheels in order to highlight the beauty and artificial effect of these trees. The commercial desirability of this product is materially increased by such means.

The present invention provides an internally illuminated tree with superior and unusual aesthetic qualities to those previously mentioned without recourse to separate external lighting devices. The invention, while hereinafter described in relation to Christmas trees, is not intended to be limited thereto, and can be used in conjunction with artificial plant arrangements of various types.

The primary object of this invention is to provide an artificial tree wherein the stems of the individual branch elements are constructed of a light transmitting material and when properly assembled to the light transmitting trunk, will effect internal illumination of the tree.

Still another object of the invention is the provision of a trunk construction for an internally illuminated artificial tree which provides for effective transmission of light rays.

Another object of the invention is the provision of a trunk construction for internally illuminated trees which properly positions the end surfaces of the stem portions of the branches relative to the path of travel of the light rays along said trunk to effect efficient transmission of said light rays to said stem end portions.

Another object of the invention is to provide an artificial tree of the character described which is especially useful with a rotating tree stand having a source of light therein; further, this object of the invention includes use of a color wheel in the stand associated with said light source for achieving novel changing light effects.

The foregoing and other objects of the invention will become apparent as the description thereof is evolved. Preferred embodiments of the invention have been described and illustrated in detail in the accompanying specification and drawings. Minor variations are deemed possible without circumventing the principles or sacrificing any of the advantages of the invention which is defined by the appended claims.

In the drawings:

FIG. 1 is a perspective view of an artificial tree embodying the invention in the erected position and represented as illuminated internally by the darkened tips of the branches.

FIG. 2 is a fragmentized sectional view of the tree with the branches attached and with portions of the base broken away to show details thereof.

FIG. 3 is a sectional view taken through the trunk of the tree along the line 3—3 of FIG. 2 and in the direction indicated.

FIG. 4 is a fragmentary enlarged sectional view, taken through the trunk of FIG. 2 and showing the relationship of the branches with respect to the trunk.

FIG. 5 is a fragmentary sectional view taken along the line 5—5 of FIG. 4 and in the direction indicated.

FIG. 6 is a fragmentary elevational view, broken away in part, to illustrate a joint construction for a modified form of trunk formed of multiple sections.

FIG. 7 is a partial elevational view of the trunk illustrating one form of branch supporting aperture that can be used.

FIG. 8 is a partial elevational view of the trunk illustrating an alternate form of branch supporting aperture.

FIG. 9 is a diagrammatical sectional view of a modified form of the invention.

FIG. 10 is a diagrammatical sectional view of a modified form of the invention illustrated in FIG. 2.

FIG. 11 is a partial sectional view of a modified form of the trunk construction.

FIG. 12 is an end view of the light diffusing end or tip of the stem or branch member.

FIG. 13 is a partial elevational view of the light diffusion end or tip illustrated in FIG. 12.

DESCRIPTION OF INVENTION

Before proceeding with the detailed description of the illustrated embodiments, it would be well to consider the basic concept underlying the invention. The invention utilizes an optical principle often referred to as trans-illumination or more commonly, as a "light pipe." This phenomena is characterized by the fact that light rays introduced into one end or edge of a relatively smooth article made of glass or certain types of transparent plastics, will be transmitted therealong, without diffusion, until the light rays encounter the translucent edge of the article or some other light diffusing obstruction. Theoretically, if the transparent light transmitting material is of a uniform density, free from imperfections and the outer surface is relatively smooth, the light rays will not be visible when the article is viewed transverse to the path of travel of said light rays. However, the light rays will travel the length of the article and will illuminate the end thereof or any translucent obstruction which may diffuse said rays. This is true irrespective of the color of the light and a translucent obstruction placed in the path of the light will glow as if it were the source of light.

Glass and most clear plastics, especially those of the methyl methacrylate type, often designated as "Lucite," possess this end or edge lighting ability and may be used in the construction of the invention.

Accordingly, the invention utilizes the aforementioned optical principle to internally illuminate an artificial tree. The trunk of the tree is constructed so as to transmit light rays along the entire length thereof. Each individual branch is comprised of a central stem element that is constructed of a light transmitting material, one end thereof formed to effect diffusion of light rays, the other end being optically associated with the light transmitting trunk so that it may receive light rays therefrom for transmission to the light diffusing end thereof, causing said end to glow.

As was mentioned previously, if the transparent material is of uniform density, no diffusion of light rays or glow will be visible when the article is viewed transverse to the path of said light rays. But, in practice, it is not desired nor commercially feasible to construct the aforementioned branch elements out of a light transmitting material of such high optical efficiency. Thus, the branch elements used will, when light is transmitted therealong, diffuse small portions of the light rays causing the branch to glow. Accordingly, by leaving a portion of the stem uncovered by the artificial foliage, an inner glow or internal lighting effect can be achieved, in addition to the illumination of the end portion of the stem.

The internally illuminated artifical tree is designated generally 20 in FIG. 1. The tree 20 is supported by a pedestal or base 22 which contains a source of illumination. The tree 20 is comprised essentially of a trunk 24 and a plurality of branches removably secured thereto, each of said branches being designated generally by the reference character 26. Each branch element 26 is comprised of a stem 27 of transparent light transmitting material which has the artificial foliage 28 attached thereto and is provided with an enlarged end portion 29. When the tree is properly assembled, the light rays from the illumination source are transmitted along the length of the trunk 24 to the end surfaces of the stems 27 where they are picked up and transmitted to the enlarged end portions 29 which will diffuse the light rays thus appearing to glow. The tree as illustrated in FIG. 1 represents the basic overall construction of the invention, and it should be understood that the trunk 24 may take various forms, all of which will provide the desired end result.

Referring now to FIG. 2, the preferred embodiment of trunk construction 24 is shown in section with a number of the branches 26 attached thereto. In addition, the base 22 is shown partially broken away to expose to view the inner assemblage thereof.

The trunk 24 in the embodiment of FIG. 2 is comprised on an outer, hollow tubular casing 30 and an inner core or position element 32. The core 32 is provided with a conical shaped end portion 34 which rests on the top of the outer casing 32. Spacers 35, constructed of a transparent light transmitting material are positioned about the core 32 and intermittently spaced along the length thereof to maintain the coaxial positioning of the core 32 with respect to the outer casing 30. Removably attached to the trunk 24 are a plurality of branch elements 26.

The outer casing 32 is provided with a plurality of axially spaced apertures 36, the exact position of which have been predetermined such that when the ends of the stems 27 of the branches are received therein, the branches will define the desired configuration for the tree. Stems 27 are received within the casing 30 and abut the inner core 32 which limits their inward extent. Apertures 36 are disposed at varying angles with respect to the axis of the trunk 24 so that only the periphery of the end surface 38 of each stem 27 abuts the core 32.

While the use of the core 32 to properly position the stems 27 is preferred, it is envisioned that the core 32 may be eliminated and other types of positioning means may be used. For example, each branch could be provided with a protuberance or some other type of means which would abut the outer casing to limit the inward extent of the stem and properly position the stem end surface 38. However, with the latter type of positioning means, in order to provide a uniformly shaped tree, each stem would have to be designed for and properly positioned in a particular aperture, which would materially rise the cost of the tree. With the use of the core 32, branches of identical length and and construction can be used, the axial placement and bias or angular disposition of the apertures 36 being predetermined to control and define the shape of the tree, as disclosed in detail in U.S. No. 2,893,149. While the preferred method of forming the stem receiving apertures is as disclosed in said patent, the invention is in no way limited thereto and is well adapted for use with tree constructions of other types, such as using branches which are not similar in length, in accordance with Patent 2,893,149.

The outer casing 30 is preferably an extruded member constructed of light weight material such as aluminum and may be provided with a highly reflective inner surface 31. Reflective surface 31 may either be a polished surface or can be a coating applied by electroplating or some other method.

While the sectional shape or design of casing 30 may be varied, it should be noted that the overall or effective length of the stem receiving apertures 36 must be sufficient to support the branch 26 in the proper position. One way to accomplish this is to provide a relatively thick wall section for the casing, but the expense would be prohibitive. The preferred construction is that as illustrated in FIGS. 3–5, and disclosed in detail in my U.S. patent application Ser. No. 605,691, filed Dec. 29, 1966. Briefly, casing 30 is provided with a plurality of axially extending radial fins or ribs 40, which have enlarged end portions 42. The end portions 42 are spaced apart by a distance that is somewhat less than the diameter of the stems 27, for a purpose that will be detailed hereinafter. Two forms or types of supporting apertures 36 may be used, namely, one which is passed directly through the rib 40 as illustrated in FIGS. 5 and 7, or one which is passed between the ribs 40, as illustrated in FIG. 8. Irrespective of the construction used, the result is that the rib portion 40 or the juxtaposed enlarged portions 42 will engage the stem 27 to provide the desired support. Thus, the illustrated form of outer casing will provide the same degree of support as a relatively thick wall casing but requires only a fraction of the material in the construction thereof.

Referring to FIG. 2, base or pedestal 22 serves a dual function of providing a support or stand for the tree and houses the source of illumination. The essential features of the base 22 are the outer casing 44, the source of illumination 46 and the bearing cup or collet 48 which receives the open end of trunk 24 and properly positions it over the light source 46 such that the rays emitted therefrom are received and transmitted along the length of the trunk. To enhance the efficiency of the arrangement and direct more light rays axially of the trunk, reflector 50, preferably of parabolic shape, is positioned below the light source at 46.

In addition, to provide a more appealing and aesthetic effect, the trunk supporting collet 48 may be rotatably mounted within the housing 44. Rotation of collet 44 is accomplished by the provision of a gear 52 on the periphery thereof which is coupled to the motor 54. The motor 54 will rotate the collet 48 which in turn will rotate the entire tree 20. A color wheel 56 may be positioned between the light source 46 and the bottom open end portion of the trunk and may be coupled to the gear 52 for rotation therewith. Thus, as the tree 20 turns, so turns the color wheel 56 and the light rays being transmitted to the trunk 24 will change colors.

The embodiment illustrated in FIG. 2 is operative generally as follows: when the light source 46 in energized, light rays of varying color will be received by and transmitted internally along the outer trunk casing 30. As previously mentioned, the casing 30 is provided with a highly reflective inner surface 31 which aids in the direction and transmission of said light rays. The stems 27 of the the branches are fabricated of a transparent light transmitting material, and have their respective end surfaces 38 positioned in the tubular casing 30 for reception of the light rays being transmitted therealong. The light rays will strike the end surfaces 38 at an angle and some will be absorbed while others are reflected or passed completely through the stem 27. The absorbed light rays will travel the length of the transparent stem 27 until they are diffused by the end portions 29, causing said end portions to glow. If desired, portions of the stems 27 may be left uncovered by the foliage 28 and since the stems 27 are not perfect light transmitters, the aforementioned uncovered portions will also glow, providing an overall internal illumination.

One problem encountered in the design of an internally illuminated tree was that the branches in the upper portions thereof failed to receive as much light as those branches in the lower portions of the tree. This resulted from the fact that as the light rays travel along the lengh of the casing 30, some are absorbed or received by the end surfaces 38 while others are reflected back along the length of the casing, the net result being that considerably less light reached the upper portions of casing 30.

To alleviate this problem, the planar end surfaces 38 of the respective stems 27 are disposed at a greater angle of inclination to the axis of the casing 30 than are the branches in the lower portions thereof. Directing attention to FIG. 4, the engagement of the stem end portion 38 with the inner core 32 is illustrated on an enlarged scale. The end surface 38 engages the core 32 only at the periphery thereof, and thus presents the entire surface area to the light rays. However, surface 38 is disposed at an angle A with respect to the light rays, accordingly, as the rays strike the end surface 38 only some will be absorbed. The amount of light rays so absorbed is directly related to the angle of inclination A in two respects. First, the severity of angle A will determine to a large degree the percent of light rays reflected, and secondly, angle A determines the overall projective area of surface 38 that is presented to the light rays. Thus, providing a small angle of inclination, A, for the lower branches less light will be absorbed by the lower branches and correspondingly, there is more light to be transmitted to the branches in the upper portion of the tree.

The core 32 is tubular in shape, but may be of solid construction and in either case is preferably formed from transparent light transmitting material. The use of a transparent core aids in the transmission of light and provides a direct path for the light rays to the uppermost branch supported by the conical end portion 34. The use of a conical shaped end portion 34 is desired in that this construction tends to confine and channel the light rays to the end surface 38 of the uppermost branch.

In FIG. 6, there is illustrated one type of joint arrangement that can be used to construct the outer casing 30 from two separate sections. The casing is divided into upper and lower sections 30′ and 30″. Lower section 30″ has been machined to provide a cylindrical end portion 51 of reduced diameter. The upper section 30′ has the central passageway enlarged to provide a socket 53 with a diameter closely approximating that of a reduced diameter cylindrical portion 51. Thus, the casing portions 30′ and 30″ can be assembled by disposing the cylindrical portion 51 in the socketed portion 53 as indicated by the arrow. This sectioned construction for the casing 30 permits more compact packaging for the product than might be the case for a single length of relatively large dimensions.

FIGS. 7 and 8 illustrate alternate forms for the stem receiving apertures 36 provided in the outer casing 30. As was previously mentioned, the casing 30 is provided with a plurality of axially extending radial fins or ribs 40, which have enlarged end portions 42. In FIG. 7 the aperture 36 is formed by removing a portion of the entire rib 40 such that the axis of aperture 36 passes directly through the rib 40. With this arrangement, the stem 27 will rest directly on the portion of the rib 40 when properly positioned in the aperture 36, as more fully illustrated in FIGS. 3 and 5.

In FIG. 8 an alternate embodiment to that of FIG. 7 is illustrated. Here, the aperture 36 is disposed between rib portions 40, and only arcuate or cord-like sections of the enlarged portions 42 need be removed in the forming of apertures 36. The removal of these cord-like portions in effect define a secondary aperture, the periphery of which is formed in the juxtaposed enlarged portions 42 and will engage and support the stem 27 upon insertion therein.

FIGS. 9 and 10 illustrate diagrammatically to a large extent two additional embodiments or constructions. It must be emphasized that these embodiments have been illustrated diagrammatically for purpose of convenience and to more effectively illustrate the distinctive features of the respective constructions. In actual practice, the embodiments of FIGS. 9 and 10 are used in the same manner as that of FIGS. 2–6, that is, they are positioned in a base which houses a light source, the light rays emitted thereby being received and transmitted along the length of the trunk. A plurality of branches are removably secured thereto, and optically associated therewith so as to be adapted to receive the light rays being transmitted along the trunk.

The embodiment illustrated in FIG. 9 utilizes a trunk, designated generally 24′, which is comprised of a solid cylindrical core element 60 constructed from a transparent light transmitting material. To prevent diffusion of the light rays and to aid in the transmission of light along the length of the core 60, the core may be provided with an opaque outer covering or coating 62. The opaque coating 62 can take many forms in that it may be comprised of a plurality of layers, the innermost being highly reflective, or it may be in the form of a tubular sheath that is telescoped over the core 60. If a tubular sheath is used, it too may be provided with a highly reflective inner surface which will aid in the transmission of the light rays.

In place of the apparatus 36 used in the previously discussed embodiment, the solid core trunk 24′ is provided with a plurality of bores 64. The branch supporting bores 64 may be constructed in accordance with the teaching of the aforementioned U.S. Patent No. 2,893,149. However, it is preferred that the bores 64 are of differing depths in addition to being positioned at varying angles with respect to the axis of the trunk. The angle of inclination of the bores 64 with respect to the axis of the trunk decreasing in a direction approaching the apex of the tree. Thus, as previously discussed in regard to the embodiment of FIG. 2, the end surfaces of the upper stems are in a more efficient optical position than are the end surfaces of the lower stem portions.

In addition, due to the different depths of the stem receiving bores 64 the effective radial penetration is not uniform, and increase in a direction approaching the apex of the tree. This construction can be readily viewed in the diagrammatic illustration of FIG. 9. With this type of disposition the lower branches will not cut off or overshadow the path of the light rays to the upper branches, said paths have been designated by lines 66.

The embodiment or trunk construction 24″ illustrated diagrammatically in FIG. 10 is similar to that of FIGS. 2–6 in that it utilizes an outer casing 30 and radially spaced inner core 32′. The outer casing 30 is provided with a plurality of apertures 36 which receive and support the stems 27. The apertures 36 are disposed at varying angles with respect to the axis of the trunk 24″ in the same manner, and for the same purpose, as discussed in regard to the embodiments of FIGS. 2–6.

The distinct feature of this embodiment is the shape or construction of the inner core 32'. The core 32' is constructed of light transmitting transparent material and is composed of a plurality of stepped or reduced diameter sections, which have been designated generally 70. The points of juncture between these respective sections 70 define a plurality of annular shoulders 72 which are intermittently spaced along the entire length thereof. While the stems 27 shown in FIG. 10 are all abutting the annular shoulders 72, it must be emphasized that FIG. 10 is merely a diagrammatic representation of the embodiment, and in actuality many of the stems 27 will abut the reduced diameter portions in much the same manner as illustrated in FIGS. 2 and 4. In addition, in the actual embodiment, the reduction in diameter is not as severe as that illustrated, but rather will take place gradually over the entire length of the tree.

With the inner core construction of FIG. 10, the stepped or reduced diameter portions 72 will be effective to stagger the radial positioning of the light ray receiving end portions of the stems 27 such that the lower branches will not block or overshadow the stem end portions of the upper branches. In addition, the annular shoulders 72 will also function as "hot spots" in that since they change the path of travel of the light rays being transmitted by the core 32' itself, a certain amount of these rays will be diffused, the shoulders 72 in effect acting as a secondary source of illumination.

As was previously discussed, the casing 30 is preferably an extruded member. In the extrusion of an one piece hollow or tubular member, it is necessary that the die utilize a mandrel to form the hollow or void. Accordingly, the member cannot be extruded too rapidly and production time, as well as cost, are greatly increased over members that are extruded without a hollow. The casing of FIG. 11, which has also been designated 30 is comprised of two interconnected identical semicircular sections 74. The ends of the semicircular sections 74 are provided with elongated interengagable dove-tail ribs and slots, 75 and 76, respectively. Thus, the two members can be inter-engaged as illustrated in FIG. 11 to provide an integral casing assembly.

FIGS. 12 and 13 illustrate one form of tip or end portion 29 that may be used on the end of stem 27 to diffuse the light rays. The tip is provided with a plurality of triangular shaped ribs 78, as illustrated.

It is believed that the invention has been described in sufficient detail to enable the skilled artisan to understand and practice the same. It is intended that the language of the claims hereto appended should be construed broadly commensurate with the achievement contributed thereby.

What it is desired to be secured by letters patent of United States is:

1. An artificial tree for use with a supporting base having a source of illumination contained therein, said tree being comprised of an elongated light transmitting trunk adapted to be supported by said base in light transmitting communication with said source of illumination whereby the light rays emitted therefrom will be received by and transmitted the length of said trunk, a plurality of branch supporting apertures formed in said trunk, and a plurality of branch elements removably secured to said trunk, each of said branch elements including a stem portion constructed of a light transmitting material and having one end thereof removably received in one of said trunk apertures, said one end being positioned in light transmitting communication with the light rays being transmitted internally along the length of said trunk such that the end surface thereof is disposed to receive light rays for transmission along the length of said stem to the other end thereof, the other end of each of said portions being provided with means to diffuse the light rays causing said end to glow, said light transmitting trunk including an apertured, hollow outer casing, and means to limit the inward penetration of said stem portions upon assembly in said supporting apertures, said means properly positioning the end surface of said stem portions for reception of the light rays being transmitted along the length of said casing, said outer casing being provided with a plurality of axially extending radial fins which partially define said supporting apertures and aid in the supporting of the individual branches.

2. An artificial tree comprised of a base having a source of illumination contained therein, an elongated, apertured light transmitting trunk supported by said base in light transmitting communication with said source of illumination, whereby the light rays emitted by said source are transmitted along the length of said trunk, a plurality of branch elements removably secured to said trunk, each of said branch elements including a stem portion constructed of a light transmitting material, and having one end thereof received in one of said trunk apertures, said ends so received in said trunk being optically associated therewith whereby their respective end surfaces are positioned to receive some of the light rays being transmitted by said trunk for transmission along their length to the other end thereof, said other end of each of said stem portions being provided with means to diffuse said light rays thereby causing said ends to glow, said elongated light transmitting trunk comprising a hollow tubular outer casing which is provided with said branch receiving and supporting apertures, and means to limit the inward extent of said light transmitting stem portions of said branches and to position the end surfaces thereof for reception of the light rays being transmitted along the length of said trunk, said outer casing being provided with a plurality of axially extending radial ribs, a portion of which is removed to define the supporting and positioning apertures for the branch elements.

3. An artificial tree for use with a supporting base having a source of illumination contained therein, said tree being comprised of an elongated light transmitting trunk adapted to be supported by said base in light transmitting communication with said source of illumination whereby the light rays emitted therefrom will be received by and transmitted the length of said trunk, a plurality of branch supporting apertures formed in said trunk, and a plurality of branch elements removably secured to said trunk, each of said branch elements including a stem portion constructed of a light transmitting material and having one end thereof removably received in one of said trunk apertures, said one end being positioned in light transmitting communication with the light rays being transmitted internally along the length of said trunk such that the end surface thereof is disposed to receive light rays for transmission along the length of said stem to the other end thereof, the other end of each of said portions being provided with means to diffuse the light rays causing said end to glow, said elongated light transmitting trunk including an apertured, hollow outer casing, and means inside of the casing to limit the inward penetration of said stem portions upon assembly in said supporting apertures, said means including a hollow cylindrical inner core element concentric with said outer casing and radially spaced therefrom, against which the periphery of said stem end surfaces abut to limit their inward extent and to expose said end surfaces to the light rays, said inner core member being constructed from a transparent, light transmitting material, said means to limit inward penetration of the stem portions properly positioning the end surfaces of said stem portions for reception of the light rays being transmitted along the length of said casing.

4. An artificial tree for use with a supporting base having a source of illumination contained therein, said tree being comprised of an elongated light transmitting trunk adapted to be supported by said base in light transmitting communication with said source of illumination whereby the light rays emitted therefrom will be received by and transmitted the length of said trunk, a plurality of branch supporting apertures formed in said trunk, and a plurality of branch elements removably secured to said trunk, each of said branch elements including a stem portion constructed of a light transmitting material and having one end thereof removably received in one of said trunk apertures, said one end being positioned in light transmitting communication with the light rays being transmitted internally along the length of said trunk such that the end surface thereof is disposed to receive light rays for transmission along the length of said stem to the other end thereof, the other end of each of said portions being provided with means to diffuse the light rays causing said end to glow, said elongated light transmitting trunk including an apertured, hollow outer casing, and means inside of the casing to limit the inward penetration of said stem portions upon assembly in said supporting apertures, said means including an inner core element concentric with said outer casing and radially spaced therefrom, against which the periphery of said stem end surfaces abut to limit their inward extent and to expose said end surfaces to the light rays, said inner core element being constructed from a transparent light transmitting material and comprising a plurality of sections of varying outer diameters so as to provide annual shoulders at the junction of each of said sections, said shoulders facing towards the upper portion of said trunk and providing light ray diffusing surfaces at intermediate points along the length of said core, said means to limit inward penetration of the stem portions properly positioning the end surfaces of said stem portions for reception of the light rays being transmitted along the length of said casing.

References Cited
UNITED STATES PATENTS

| | | |
|---|---|---|
| 1,351,562 | 8/1920 | Foster. |
| 1,921,614 | 8/1933 | Frei. |
| 2,125,906 | 8/1938 | Frei. |
| 2,125,907 | 8/1938 | Frei. |
| 2,227,861 | 1/1941 | Petrone. |
| 3,206,593 | 9/1965 | Winnicki. |
| 3,163,573 | 12/1964 | Brooks _____ 161—24 |

NORTON ANSHER, Primary Examiner

D. S. STALLARD, Assistant Examiner

U.S. Cl. X.R.

161—22